May 30, 1933.    F. H. MUELLER ET AL    1,911,708
INSERTING VALVE
Filed March 14, 1931    3 Sheets-Sheet 1

Inventors
Frank H. Mueller
Loie Conde

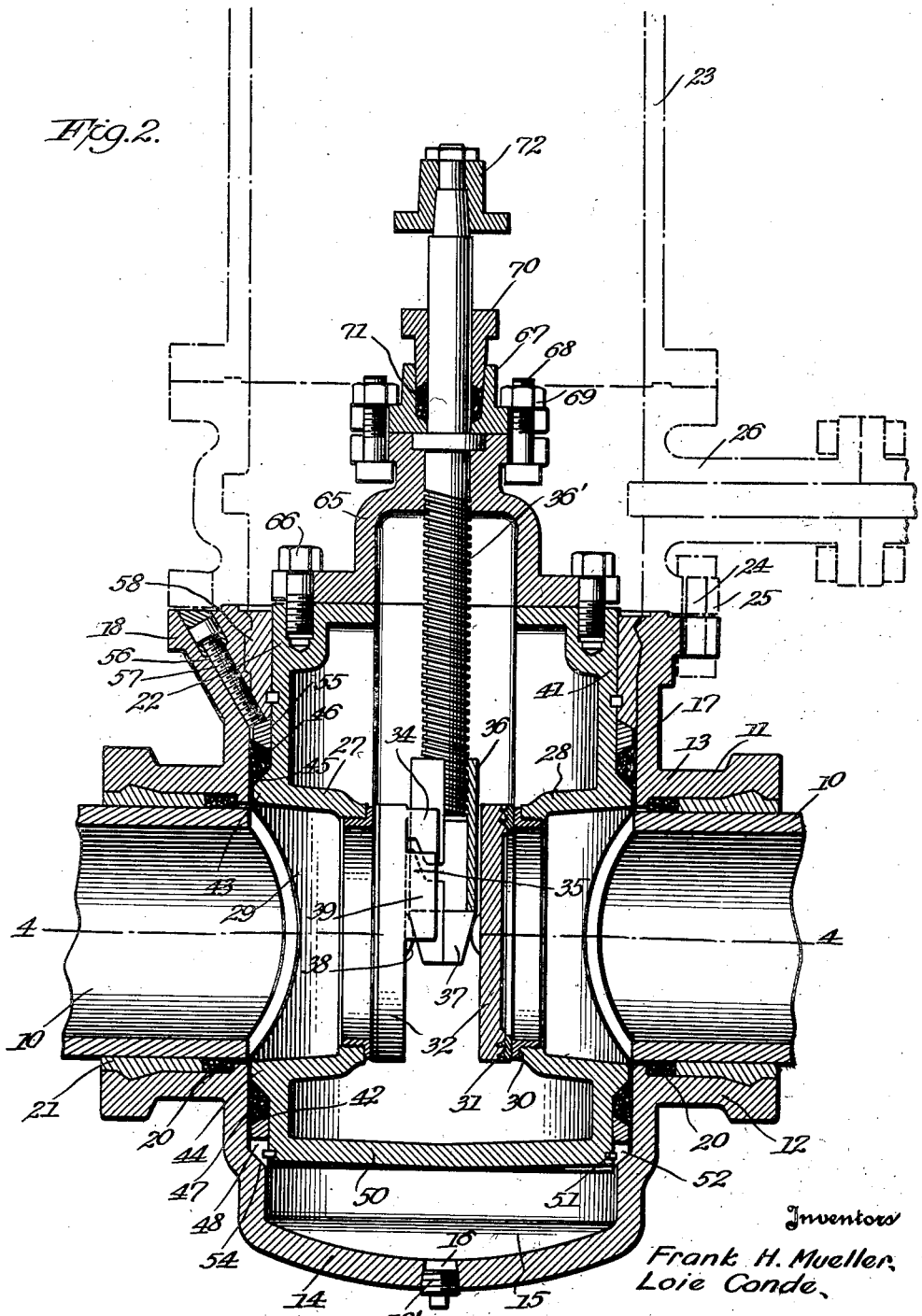

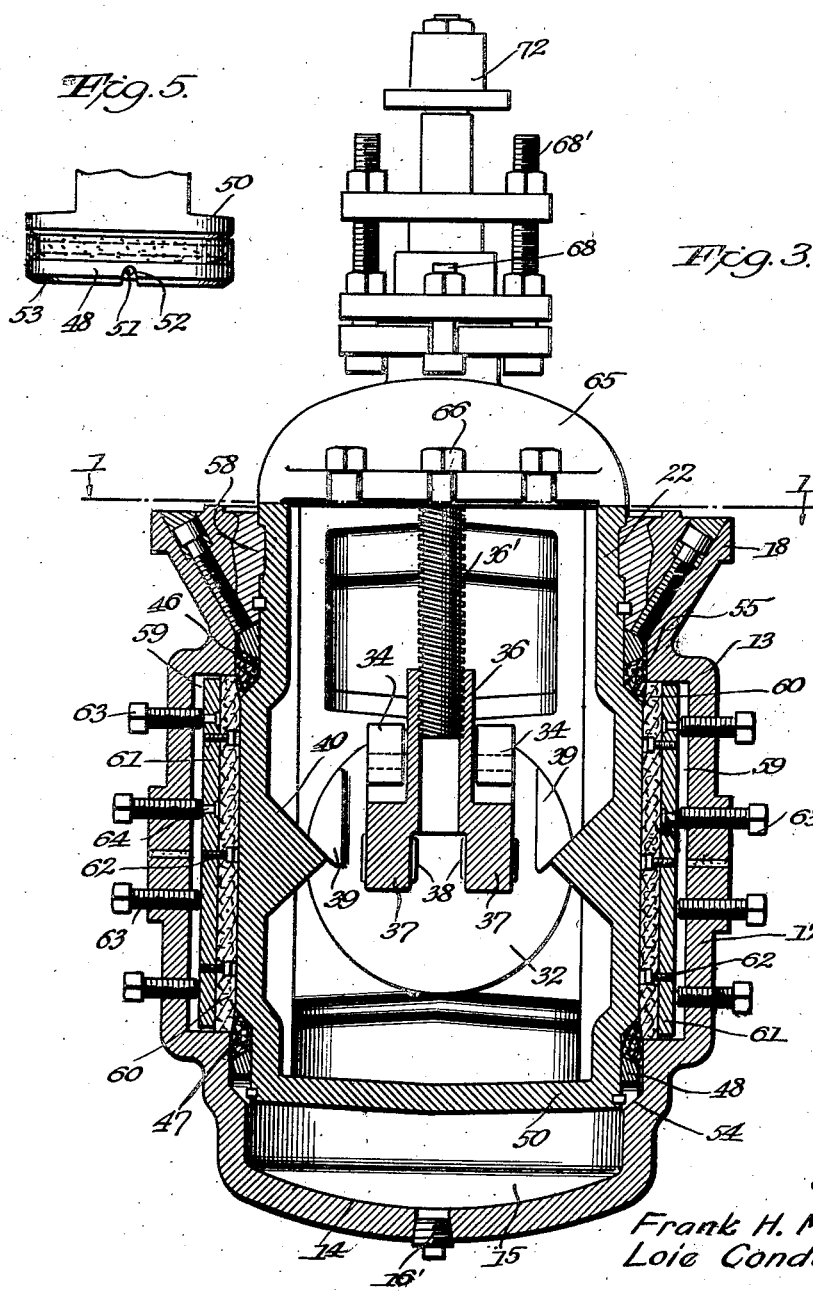

Patented May 30, 1933

1,911,708

UNITED STATES PATENT OFFICE

FRANK H. MUELLER AND LOIE CONDÉ, OF DECATUR, ILLINOIS, ASSIGNORS TO MUELLER CO., OF DECATUR, ILLINOIS, A CORPORATION OF ILLINOIS

INSERTING VALVE

Application filed March 14, 1931. Serial No. 522,616.

The present invention relates to improvements in the construction and operation of valves and more especially to that type of valve arranged to be permanently inserted in a supply main or pipe after the main has been severed by a cutter.

One of the important objects of the invention consists in the provision of a specially designed insertable valve unit and packing which are associated with each other and the valve casing, to insure a tight joint being formed between the parts when the valve unit is inserted in the main.

A further object comprehends the provision of simple and efficient means for forcing and maintaining the packing in tight engagement with the valve unit and the casing.

Another object of the invention is to provide packing screws or the like which extend through inclined openings in the wall of the valve casing and engage a packing ring in order to establish a tight joint between the parts. The packing screws are positioned so as to enable the inserting machine for the cutter and valve unit, to be directly connected to the valve casing, thus eliminating the necessity of using temporary joints such as were heretofore required for preventing the escape of the fluid when the valve unit was being installed into the main.

A further object consists in providing a valve unit with reduced upper and lower portions positioned on opposite sides of the main and associating with each of the reduced portions, an upper packing and a lower packing, the lower packing being arranged to be forced into tight engagement with the valve unit by the liquid pressure in the main while means extending through the casing are arranged to force the upper packing into proper position in order to provide a tight joint between the parts.

Another object consists in forming a leakproof joint between the casing and the valve unit, said joint comprising vertically disposed packing arranged on opposite sides of the valve casing and adapted to be compressed against the valve unit by an externally actuated movable plate.

Other objects and advantages of the invention will become apparent from the following description when taken in conjunction with the accompanying claims and drawings.

Referring to the drawings, in which is shown a preferred embodiment of the invention:

Figure 2 is a sectional view taken substantially along the line 2—2 of Figure 1.

Figure 3 is a sectional view taken substantially along the line 3—3 of Figure 1.

Figure 5 is a detailed reduced view of the lower end of the valve unit showing the connection of the packing ring thereto.

Figure 1:
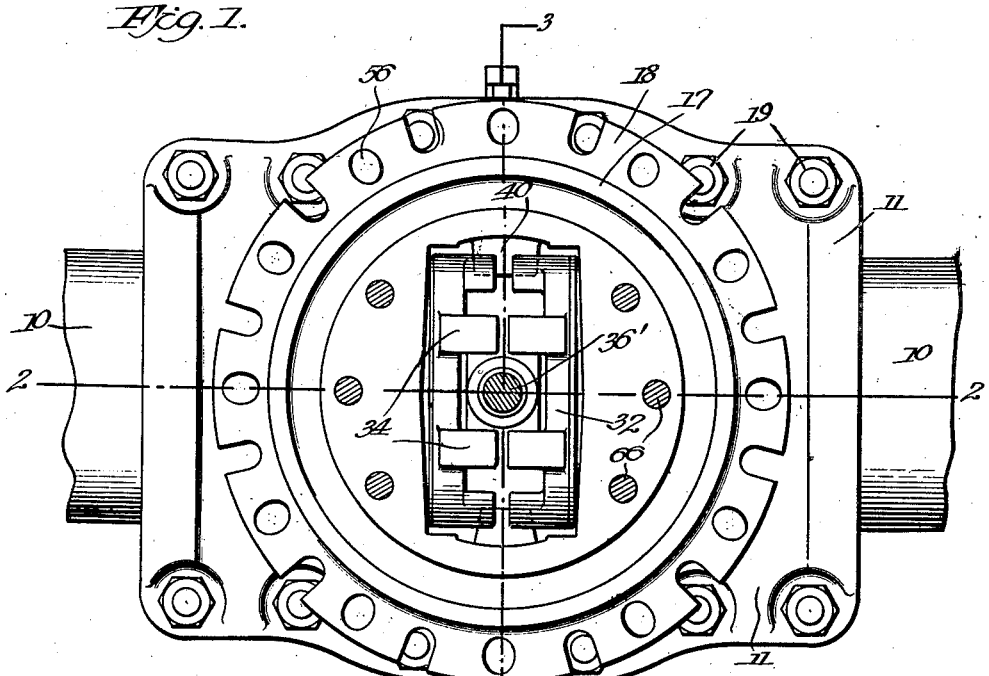
Figure 1 is a sectional view taken substantially along the line 1—1 of Figure 3.

Referring to the drawings in which like numerals indicate like parts in the several views, 10 designates the spaced sections of a supply pipe or main after they have been severed and the cutout portion removed preferably in the manner as shown in the Brandriff application, Serial No. 258,958, filed March 3, 1928. A valve casing 11 is arranged to be permanently secured to the main at the point where it is severed, and this casing preferably comprises a lower section 12 and an upper section 13. The section 12 may be formed with a medially disposed depending bottom portion 14 so as to provide a chamber 15 arranged to communicate with the atmosphere through an opening 16 in the bottom that is controlled by a removable threaded plug 16'.

The upper section 13 of the casing is formed with a tubular portion 17 which is provided with an annular flange 18. The sections 12 and 13 may be clamped together by the bolts 19 (Fig. 1) and a tight joint is established between the pipe 10 and the adjacent wall of the valve casing through the instrumentality of the packing 20 and the calking material 21. The valve unit 22 which includes the bonnet 65 secured to said valve unit by bolts 66, a stem stuffing box 67, fastened to the bonnet by bolts 68 and 68' and an adjustable stem stuffing gland 70 secured by bolts 68', is arranged to be inserted in the opening formed by the cutter after the severing operation has been completed. The unit 22 is properly positioned in the main by the inserting machine 23, the lower portion of which machine is shown in dotted lines in Fig. 2, and is substantially similar in construction and operation to the inserting machine disclosed in the Brandriff application, Ser. No. 258,958, previously referred to.

In order to permit the cutting operation to be effected and the valve unit inserted in the main without the necessity of providing temporary joints such as were formerly made with leather cup washers and the like, we have provided a specially constructed valve unit and a packing, which are arranged so as to permit the inserting machine 23 and its associated parts to be connected to the top of the valve casing 11 by the bolts 24 which extend through the flange 18 and a complementary flange 25 on the lower portion of the auxiliary slide valve 26 that constitutes a part of the removable inserting machine 23. It will be seen that by reason of this connection of the inserting machine with the valve casing, that a more stable and firm means are provided for supporting the valve cutting instrumentalities and inserting the valve unit into the main after it has been severed, due to the fact that the machine 23 does not rest on a temporary packing flange but is directly supported by the valve casing 11.

The valve unit 22 is formed with the spaced horizontally disposed portions 27 and 28 which are provided with the openings 29 that align with the passage in the main. Each of the portions 27 and 28 have threaded thereto, a valve seat 30 that coacts with a complementary portion 31 on each of the valve gates 32 for controlling the flow of supply through the main. The valve gates 32 have on their inner faces a pair of depending hook members 34 (Fig. 2) arranged to receive complementary formed members 35 carried by sleeve 36 that is threaded to the valve stem 36' so as to cause the raising and lowering of the valve gates upon the rotation of the stem 36'. The lower end of the sleeve 36 is provided with spaced tapered lugs 37 which constitute a wedge and engage opposed curved projections 38 on the inner faces of the valve gates 32 so as to force the gates into tight engagement with the seat 30 when the valve stem 36' is actuated to move the gates to their closed position. Each of the gates 32 is also formed on its inner face and adjacent the periphery thereof with a pair of tapered lugs 39 (Fig. 3) that are arranged to seat against the complementary formed projections 40 on the valve casing so as to act as stops for the gates when the parts are moved to their closed position.

The valve unit 22 is formed on opposite sides of the portions 27 and 28 with upper and lower reduced portions 41 and 42 which terminate adjacent the severed sections of the main 10 in the enlarged heads or flanges 43 and 44, each of which flanges is provided with a tapered seat 45 arranged to receive the upper packing 46 and the lower packing 47. The lower or inner packing 47 may be held in its seat by a metallic ring 48 which is loosely carried by the lower head portion 50 of the valve unit and is connected thereto by the pins 51 which are imbedded in the valve head 50 and extend into the vertically disposed slots 52 formed in the ring 48 (Fig. 5) so as to prevent the ring from dropping off of the valve head 50 when the valve unit is being inserted into the casing. The ring 48 is also formed with a tapered end portion 53 arranged to engage a seat 54 in the section 12 of the valve casing so as to provide means for limiting the inward movement of the valve unit when it is inserted into the casing.

A metallic ring 55 fits on the upper reduced portion 41 and engages the adjacent packing 45. A series of peripherally disposed packing screws or the like 56, extend preferably through inclined openings 57 formed in the annular flange 18 of the casing so as to engage the ring 55 and force the packing 46 into tight engagement with the adjacent walls of the casing and the valve unit when the parts are set up.

Assuming that the sections of the main have been severed by the cutter carried by the inserting machine 23 referred to in the Brandriff application, Ser. No. 258,958, and the valve unit 22 has been inserted in the cut-out portion of the main by the inserting machine so as to assume the position as shown in Fig. 2, it will be seen that the water pressure will be the same in the chamber 15 as in the main and the other interior parts of the valve casing. In order therefore to force the packing 47 into tight engagement with its seat, it is merely necessary to remove the plug 16' from the opening 16 so as to allow the pressure in the chamber to escape. When this is effected, the pressure of the water above the chamber 15 will force the valve unit downwardly into the casing, thus causing the packing 47 to be forced against the adjacent walls of the casing and valve unit. The annularly disposed screws 56 are then set up against the metal ring 55 so as to compress the upper packing 46 against the adjacent surfaces of the valve unit and the casing. The upper reduced portion 41 of the valve unit is appreciably spaced from the adjacent wall of the valve casing and this space is preferably sealed and calked with lead 58 after the valve unit has been inserted, so as to provide a permanent installation which insures a liquid-proof seal being formed between the parts and does not depend solely upon the packing for making a tight joint.

Figure 4:
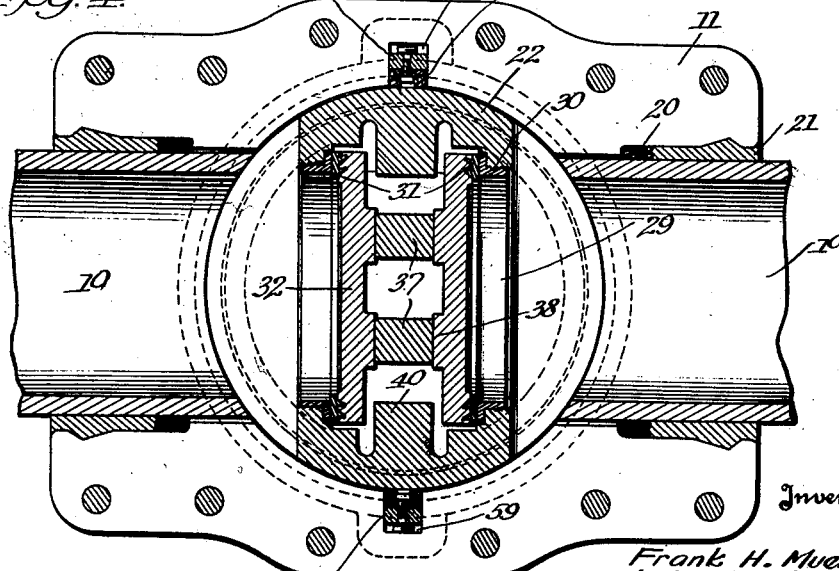
Figure 4 is a sectional view taken substantially along the line 4—4 of Figure 2.

The valve casing 11 is preferably provided with opposed vertically disposed recesses 59 (Fig. 4) in which is positioned a packing 60 that is connected to a movable plate 61 by the screws 62. The packing 60 is compressed against the valve unit 22 so as to provide a leakproof joint by means of the threaded bolts 63 which extend laterally through the casing 11. The bolt 63 may be formed with reduced flange portions 64 so as to be permanently connected to the plate 61.

After the valve unit 22 and its associated parts have been inserted in the proper position in the valve casing by the inserting machine 23, the latter is removed. A bonnet 65 is then preferably connected to the top of the valve unit 22 through the instrumentality of the bolts 66. The valve stem 36 extends through the bonnet 65 and a bushing 67 may be connected to the bonnet by the bolts 68 and nuts 69, which bushing receives a packing 71 and a gland 70, so as to provide a watertight seal around the valve stem. The outer extremity of the valve stem 36 may have connected thereto a polygonal nut or the like 72 to which any suitable tool such as a wheel can be attached for actuating the valve.

It is to be understood that the form of the invention herewith shown and described, is merely illustrative of a preferred embodiment and such changes may be made as fall within the purview of one skilled in the art without departing from the skill of the invention and the scope of the appended claims,

I claim:

1. In combination with a main having a valve casing secured thereto, a valve unit mounted in said casing for controlling the flow of the supply through the casing, said valve unit having tubular inwardly extending valve seat portions in alignment with the main, valve means coacting with said seats for controlling the flow of the supply through the casing, said valve unit having reduced end portions terminating in opposed spaced flanges adjacent the outer ends of the valve seat portions, upper and lower packing carried by the reduced portions, a retaining ring associated with each packing, means movably connecting the lower ring with the adjacent portion of the valve unit, said casing having a depending bottom portion forming a chamber into which the valve unit extends, said chamber having an opening communicating with the atmosphere, a removable plug for closing said opening, whereby upon the removal of the plug, the pressure in the chamber is allowed to escape therefrom to force the lower packing into tight engagement with the casing and valve unit, and inclined screws extending through the top of the casing and engaging the upper ring to force the adjacent packing into engagement with the casing and valve unit.

2. In combination with a main having a valve casing secured thereto, said casing provided with an upwardly medially disposed tubular portion, a valve unit extending into said tubular portion and having inwardly extending valve seats arranged in alignment with the main, valve means coacting with said seats for controlling the flow of the supply through said casing, said valve unit having reduced end portions terminating in opposed spaced flanges adjacent the main, upper and lower packing carried by the reduced portions, a retaining ring associated with each packing, means movably connecting the lower ring with the adjacent portion of the valve unit, said casing having a depending bottom portion forming a chamber into which the valve unit extends, said chamber having an opening communicating with the atmosphere, a removable plug for closing said opening whereby upon removal of the plug, the pressure in the chamber is allowed to escape therefrom to force the lower packing into engagement with the casing and valve unit, inclined screws extending through the tubular portion of the casing and engaging the upper ring to force the adjacent packing into engagement with the casing and valve unit, and calking means inserted between the upper portion of the casing and the valve unit for maintaining a tight seal between the parts.

In testimony whereof we have hereunto set our hands.

FRANK H. MUELLER.
LOIE CONDÉ.